United States Patent
Chung et al.

(10) Patent No.: US 8,537,084 B2
(45) Date of Patent: Sep. 17, 2013

(54) LIQUID CRYSTAL PANEL AND DISPLAY APPARATUS INCLUDING LIQUID CRYSTAL PANEL

(75) Inventors: Te-Chen Chung, Kushan (CN); Tean-Sen Jen, Kushan (CN); Yu-Wen Chiu, Kushan (CN); Chia-Ta Liao, Kushan (CN)

(73) Assignee: Infovision Optoelectronics (Kunshan) Co., Ltd., Kunshan (CN)

( * ) Notice: Subject to any disclaimer, the term of this patent is extended or adjusted under 35 U.S.C. 154(b) by 830 days.

(21) Appl. No.: 12/426,758

(22) Filed: Apr. 20, 2009

(65) Prior Publication Data

US 2009/0262061 A1 Oct. 22, 2009

(30) Foreign Application Priority Data

Apr. 21, 2008 (CN) .......................... 2008 1 0090489

(51) Int. Cl.
G09G 3/36 (2006.01)

(52) U.S. Cl.
USPC ............................................. 345/87; 345/50

(58) Field of Classification Search
USPC ...................... 345/50, 87, 104, 100
See application file for complete search history.

(56) References Cited

U.S. PATENT DOCUMENTS

| 2003/0095091 A1 | 5/2003 | Enomoto et al. |
| 2005/0001808 A1 | 1/2005 | Lee .................................. 345/96 |
| 2008/0062112 A1* | 3/2008 | Umezaki ....................... 345/100 |
| 2008/0180371 A1* | 7/2008 | Shie ................................ 345/87 |

FOREIGN PATENT DOCUMENTS

CN 101271232 A 9/2008

* cited by examiner

Primary Examiner — Adam R Giesy
(74) Attorney, Agent, or Firm — Marshall, Gerstein & Borun LLP (57) ABSTRACT

A liquid crystal panel includes a plurality of pixel units, each of which include gating lines, data lines, a pixel electrode and a thin film transistor (TFT). Common electrodes of first pixel units in a same row are electrically connected via a first common line, and common electrodes of second pixel units in the same row are electrically connected via a second common line. The first common line is connected with a first common voltage and the second common voltage is connected with a second common voltage. The first common voltage and the second common voltage are alternating current voltages and have opposite polarities in the same frame. The liquid crystal panel can decrease power consumption of a source driver and lower cost of the liquid crystal panel.

12 Claims, 5 Drawing Sheets

Figure 1

*(PRIOR ART)*

Figure 2

*(PRIOR ART)*

LIQUID CRYSTAL PANEL AND DISPLAY APPARATUS INCLUDING LIQUID CRYSTAL PANEL

CROSS-REFERENCE TO RELATED APPLICATION

This application claims priority to and expressly incorporates by reference Chinese patent application No. 200810090489.0 filed Apr. 21, 2008.

FIELD OF THE INVENTION

The present invention relates to the field of liquid crystal displays, and more particularly to a liquid crystal panel and a liquid crystal display apparatus having the same.

BACKGROUND OF THE INVENTION

With wide applications of the liquid crystal panel, there have been improvements in the development of liquid crystal panels. In order to improve display quality of the liquid crystal panel and decrease power consumption of a liquid crystal display, a conventional liquid crystal panel generally adopts a dot-inversion driving technology, which can improve the display quality of the liquid crystal panel but can increase power consumption of a source driver.

Figure 1:
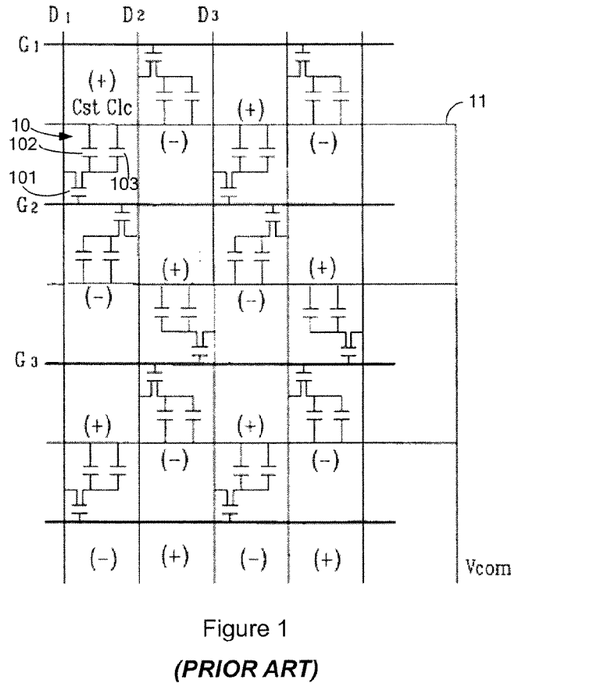
FIG. 1 is an equivalent circuit illustrating a part of the conventional liquid crystal panel.

FIG. 1 is an equivalent circuit illustrating a part of a conventional liquid crystal panel. As shown in FIG. 1, the liquid crystal panel includes N×M pixel units (only 3×4 pixel units are shown in the Figure), where N is the number of columns of the pixel units and M is the number of rows of the pixel units. Each pixel unit 10 includes a gating line G1, a gating line G2, or a gating line G3 . . . , a data line D1, a data line D2, or a data line D3 . . . , a Thin Film Transistor 101, a storage capacitor 102 and a liquid crystal capacitor 103. A common line 11 is configured between the gating lines. One end of the storage capacitor 102 is a pixel electrode (not shown in the Figure); and the other end of the storage capacitor 102 is a storage electrode (not shown in the Figure). One end of the liquid crystal capacitor 103 is a pixel electrode (not shown in the Figure), and the other end of the liquid crystal capacitor 103 is a contraposition electrode (not shown in the Figure). The gate electrode of the Thin Film Transistor 101 (not shown in the Figure) is electrically connected with the gating line G2; the source electrode of the Thin Film Transistor 101 (not shown in the Figure) is electrically connected with data line D1; and the drain electrode of the Thin Film Transistor 101 (not shown in the Figure) is electrically connected with the pixel electrode (not shown in the Figure) through a through hole (not shown in the Figure).

In the liquid crystal panel shown in FIG. 1, the pixel units 10 with the same polarity in two adjacent columns are electrically connected with one data line. In one frame time, when gating pulses are inputted to different gating lines, i.e. different gating lines are scanned, the amplitude of a voltage applied to a single data line changes little because the pixel units electrically connected with the single data line have the same polarity, and thereby the power consumption of the source driver is decreased relatively.

Figure 2:
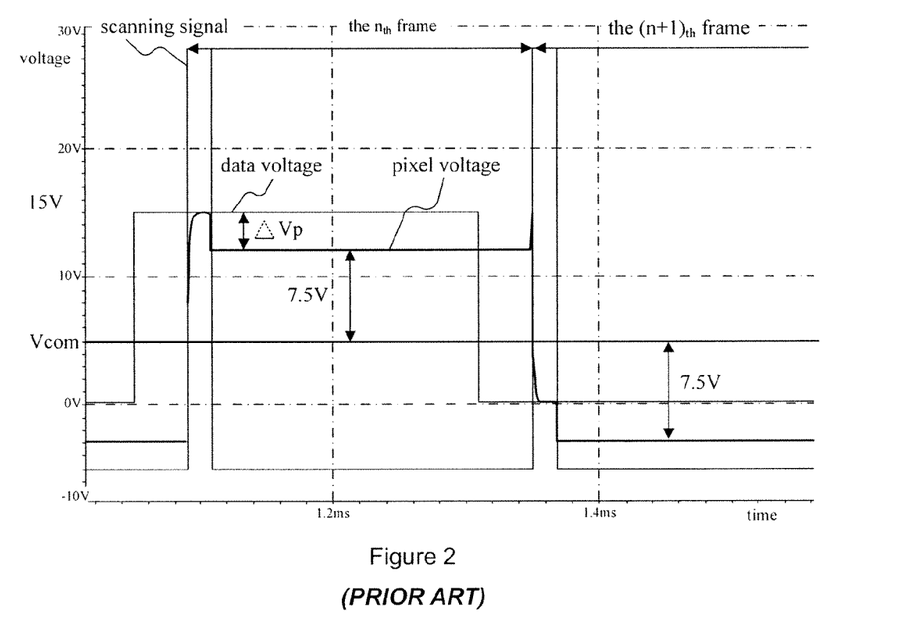
FIG. 2 is a driving simulation chart of the conventional liquid crystal panel shown in FIG. 1.

FIG. 2 is a driving simulation chart of the conventional liquid crystal panel shown in FIG. 1. At the time of alternation between frames, a single data line provides each pixel unit 10 with a plurality of inverted data voltages. For example, in the $n_{th}$ frame, a data voltage higher than a common voltage Vcom is applied to the pixel electrode, and the pixel unit has a positive polarity represented as "+". In the $(n+1)_{th}$ frame, a data voltage lower than the common voltage Vcom is applied to the pixel electrode, and the pixel unit has a negative polarity represented as "−". When a gating pulse is applied to a corresponding gating line, the Thin Film Transistor 101 connected with the corresponding gating line is turned on, the data voltage is applied to the pixel electrode (not shown in the Figure), and the liquid crystal capacitor 103 and the storage capacitor 102 are charged. When the gating pulse applied to the corresponding gating line is off, the Thin Film Transistor 101 is disconnected with the corresponding gating line, and the pixel electrode (not shown in the Figure) keeps a voltage value after being charged until the Thin Film Transistor 101 is turned on again.

In the $n_{th}$ frame, the data voltage of 15 V is applied to the data line. After a scanning start signal is applied to a gating line and when the gating line is on a high level, the Thin Film Transistor connected with the gating line is turned on. Through the Thin Film Transistor, the liquid crystal capacitor of the pixel unit is charged with the data voltage of 15V on the data line, and the pixel voltage on the pixel electrode reaches a voltage value equal to the destination data voltage. However, at the moment that the scanning signal is off, a decreasing feed-through voltage ΔVp is generated for the pixel voltage. After the scanning signal is off, the gating line is on a low level, the Thin Film Transistor is disconnected from the gating line, and the pixel electrode keeps the pixel voltage at about 12.5V. The common voltage Vcom is a constant 5V, and the liquid crystal voltage between the two ends of the liquid crystal capacitor maintains a positive voltage of about 7.5V.

In the $(n+1)_{th}$ frame, after the scanning start signal is applied to the gating line and the gating line is on the high level, the Thin Film Transistor connected with the gating line is turned on. Through the Thin Film Transistor, the liquid crystal capacitor of the pixel unit is charged with the data voltage of 0V on the data line, and the pixel voltage on the pixel electrode reaches a voltage value equal to the destination data voltage. However, at the moment that the scanning signal is off, a decreasing feed-through voltage ΔVp is generated for the pixel voltage. After the scanning signal is off, the gating line is on a low level, the Thin Film Transistor is disconnected with the gating line, and the pixel electrode keeps the pixel voltage at about 2.5V. The common voltage Vcom is 5V, and the liquid crystal voltage between the two ends of the liquid crystal capacitor maintains a negative voltage of about 7.5V.

In the conventional driving circuit for the Liquid Crystal Display (LCD) apparatus with an In-Plane Switching (IPS) liquid crystal panel or a Fringe-Field Switching (FFS) liquid crystal panel, an invariable Direct Current (DC) voltage value is taken as the common voltage, data voltages with a positive or a negative polarity respectively are provided to the data line in different frames alternatively. The polarities and value of the liquid crystal voltage applied between the two ends of the liquid crystal capacitor in the pixel unit depend on the polarities and values of the data voltage as well as the value of the common voltage. In order to stabilize the liquid crystal voltage at a demanded value, a source driver with a higher output voltage difference must be used so as to apply a high voltage to the pixel unit 10. This, however, increases the power consumption of the source driver and increases the costs of use of the liquid crystal panel.

SUMMARY OF THE INVENTION

Embodiments of the invention provide a liquid crystal panel, which can decrease power consumption of a source driver and lower cost of the liquid crystal panel.

In some examples, a liquid crystal panel includes multiple pixel units; each of the multiple pixel units comprises gating lines, data lines, a pixel electrode and a Thin Film Transistor (TFT). Common electrodes of the first pixel units in the same row of the liquid crystal panel are electrically connected via a first common line, while common electrodes of the second pixel units in the same row of the liquid crystal panel are electrically connected via a second common line.

The embodiments of the invention also provide a display apparatus including the above liquid crystal panel.

In the embodiments of the present invention, the first common line and the second common line are configured in the IPS liquid crystal panel; the common electrodes of the first pixel units are electrically connected through the first common line; and the common electrodes of the second pixel units are electrically connected through the second common line. When the data voltage is on the high level, the first common voltage Vcom1 and the second common voltage Vcom2 change to be on the low level. When the data voltage is on the low level, the first common voltage Vcom1 and the second common voltage Vcom2 change to be on the high level. Further, in combination with the change of the data voltage, the source driver with 10V voltage difference can apply 7.5V voltage to the liquid crystals. Comparatively, in the conventional technology, only the source driver with 15V voltage difference can apply 7.5V voltage to the liquid crystals. Therefore, the voltage difference outputted by the source driver in the embodiments of the present invention is smaller, which can decrease the power consumption of the source driver.

DETAILED DESCRIPTION

Example embodiments of the invention are described hereinafter with reference to the accompanying drawings and detailed descriptions.

Figure 3:
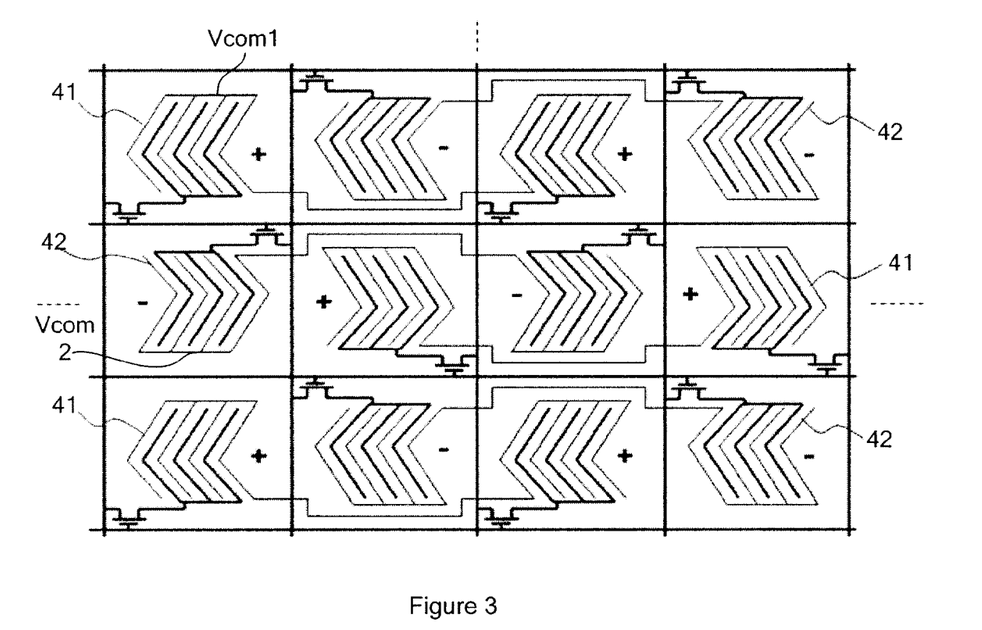
FIG. 3 is a plan view illustrating a part of a liquid crystal panel according to an embodiment of the invention.

FIG. 3 is a plan view illustrating a part of a liquid crystal panel according to an embodiment of the invention. As shown in FIG. 3, the IPS liquid crystal panel includes first pixel units, second pixel units, a first common line and a second common line. The common electrodes of the first pixel units in each row are electrically connected via the first common line, and the common electrodes of the second pixel units in each row are electrically connected via the second common line. The first common line and the second common line are connected with a first common voltage and a second voltage respectively. The first common voltage and the second voltage are respectively applied with alternating current voltages with different polarities, so as to drive the pixel units in combination with the change of data signals.

For convenience, only an array substrate configured with gating lines, data lines, common lines and Thin Film Transistors is illustrated in FIG. 3, and a color filter substrate configured opposite to the array substrate is omitted. As shown in this figure, a first common line 41 is electrically connected with the first common voltage Vcom1; and a second common line 42 is electrically connected with the second common voltage Vcom2. When the liquid crystal panel is on, in the $n_{th}$ frame, the polarities of the pixel units electrically connected with the first common line 41 are opposite to those of the pixel units electrically connected with the second common line 42. The first common line 41 is electrically connected with the common electrodes of the pixel units with positive polarities, and the second common line 42 is electrically connected with the common electrodes of the pixel units with negative polarities. In the $(n+1)_{th}$ frame, the polarities of all the pixel units are inverted, the first common line 41 is electrically connected with the common electrodes of the pixel units with negative polarities, and the second common line 42 is electrically connected with the common electrodes of the pixel units with positive polarities. In the embodiments of the invention, with the change of the data signals, the first common voltage Vcom1 and the second common voltage Vcom2 also alternate voltages, so as to invert polarities of the pixel units. A specific embodiment illustrating the voltage alternation of the first common voltage Vcom1 and the second common voltage Vcom2 will be described in detail with reference to FIG. 7 and FIG. 8.

Figure 4:
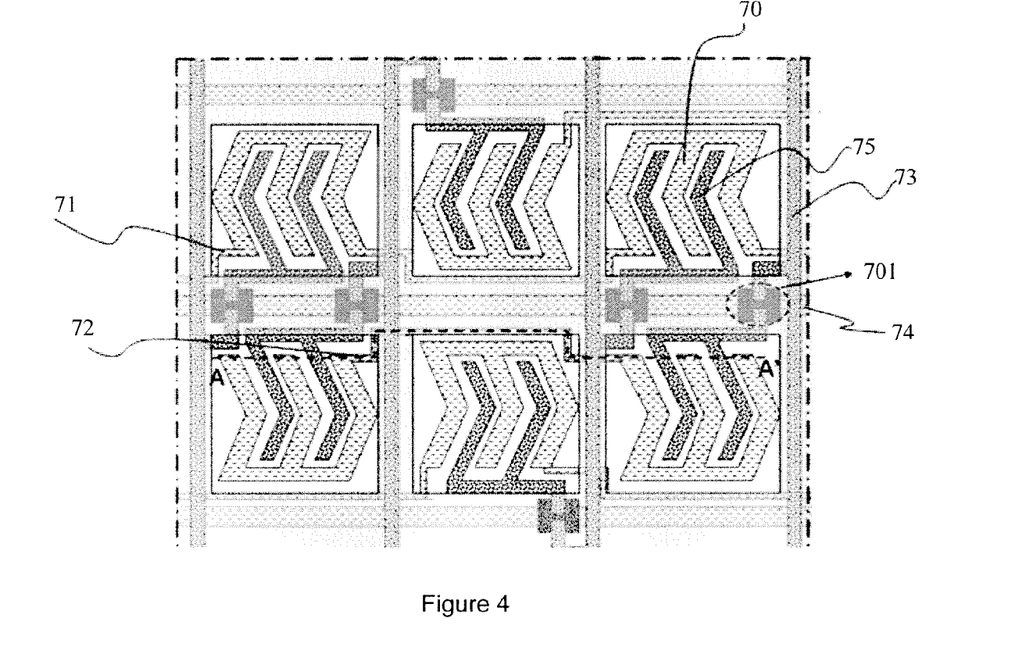
FIG. 4 is a plan view illustrating an IPS liquid crystal panel according to a first embodiment of the invention.

FIG. 4 is a plan view illustrating an IPS liquid crystal panel according to a first embodiment of the invention. In FIG. 4, only a Black Matrix (BM) rather than the whole color filter substrate is shown. What is different from a general liquid crystal panel is that the pixel electrode and the contraposition electrode (called a common electrode in this embodiment) in the IPS liquid crystal panel are configured in parallel in the array substrate. Common electrodes 70 of the first pixel units in each row are connected via a first common line 71 and are applied with the first common voltage Vcom1. The common electrodes 70 of the second pixel units in each row are connected via a second common line 72 and are applied with the second common voltage Vcom2. A Thin Film Transistor 701 receives a scanning start signal from a gating line 74, applies the data voltage of a data line 73 to a pixel electrode 75 of a liquid crystal capacitor (where the two electrodes of the liquid crystal capacitor in this embodiment are the common electrode 70 and the pixel electrode 75, respectively), so that the liquid crystal capacitor is charged. The voltage between the two ends of the liquid crystal capacitor increases to be close to the data voltage. A horizontal electric field is formed between the pixel electrode and the common electrode 70 with the common voltage, and the liquid crystal molecules rotate to some angles according to the electric field intensity so that the transmitting light intensity is controlled and the gray scale is formed for display. In addition, each pixel unit further includes a storage capacitor which includes a storage electrode (not shown) and a pixel electrode.

Figure 5:
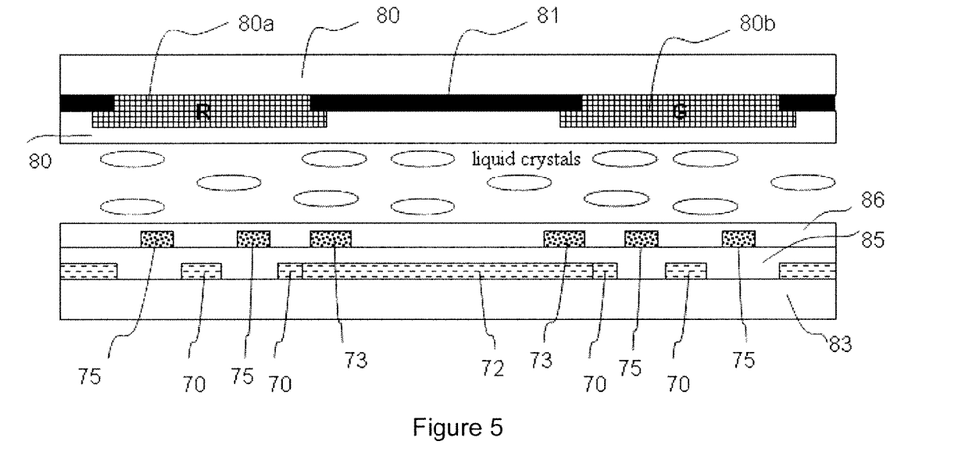
FIG. 5 is a sectional view along an A-A' direction after the combination of the upper and the lower substrates in FIG. 4.

FIG. 5 is a sectional view along an A-A' direction in FIG. 4. As shown in FIG. 5, the liquid crystal panel includes an upper substrate, a lower substrate and a liquid crystal layer between both substrates. The upper substrate is a color filter substrate, which includes an upper glass substrate 80, color filters 80a and 80b attached to the upper glass substrate (where the color filters have three primary colors, RED short for R represented by 80a, GREEN short for G represented by 80b, and BLUE not shown in the Figure), and a black matrix 81 configured between the color filters, and partially overlapping the color filters at the two sides thereof to prevent light leakage.

The lower substrate is an array substrate which includes a lower glass substrate 83, a first metal layer, a gate insulation layer 85, a second metal layer and a passivation layer 86, where the first metal layer is covered with the gate insulation layer 85, and the second metal layer is covered with the passivation layer 86.

The first metal layer includes common electrodes 70 and the second common line 72. The two ends of the second common line 72 are electrically connected with some branches of the common electrodes 70, respectively. The central top of the second common line 72 corresponds to the black matrix 81 of the upper substrate, and is hidden entirely for preventing light leakage. The first metal layer is covered with the gate insulation layer 85 for preventing the electrical connection between the first metal layer and the second metal layer and the electrical connection among the common electrodes 70 of the first metal layer.

The second metal layer which includes pixel electrodes 75 and data lines 73 is configured on the gate insulation layer 85. The second metal layer is covered with the passivation layer 86.

After the combination of the upper substrate and the lower substrate, the position and characteristic of the first common line is similar to those of the second common line, which will not be described in detail again.

Figure 6:
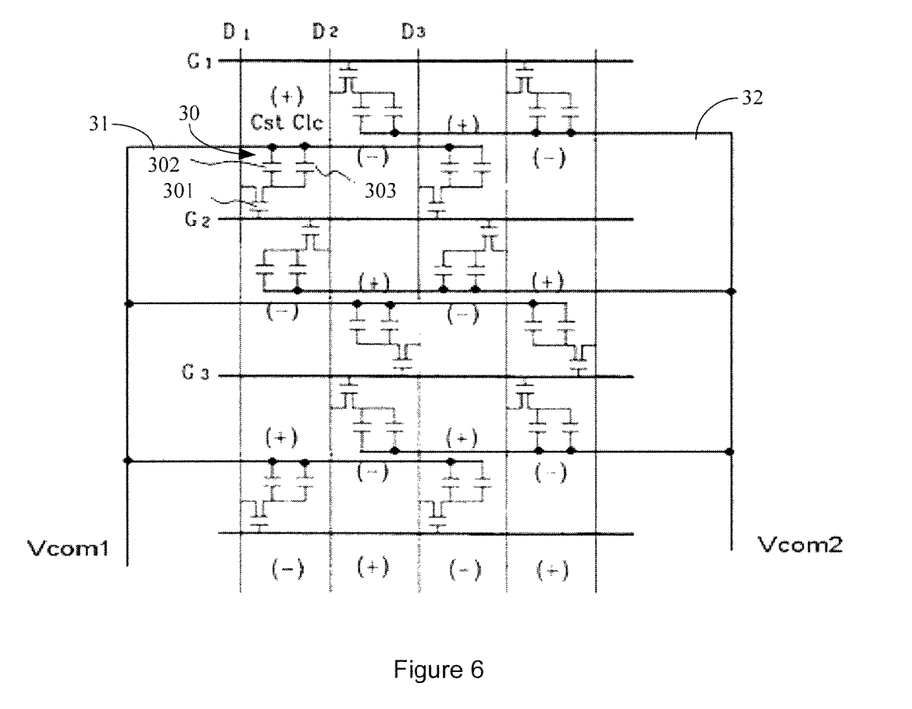
FIG. 6 is an equivalent circuit illustrating a part of a liquid crystal panel according to the first embodiment of the invention.

FIG. 6 is an equivalent circuit illustrating a part of a liquid crystal panel according to the first embodiment of the invention. As shown in FIG. 6, a gating line G1, a gating line G2, a gating line G3 etc. intersect respectively a data line D1, a data line D2, a data line D3 etc., where a first common line 31 and a second common line 32 are configured between two adjacent gating lines while the first common line 31 is connected with a first common voltage Vcom1 and the second common line 32 is connected with a second common voltage Vcom2. When the pixel units are in the dot-inversion driving manner, each pixel unit 30 has a polarity opposite to polarities of its adjacent pixel units, in other words, the pixel units 30 with the same polarity are not adjacent to each other. The pixel unit 30 includes a Thin Film Transistor 301, a storage capacitor 302 and a liquid crystal capacitor 303. Each data line is electrically connected with the pixel units with the same polarity in two adjacent columns. In two adjacent rows, a gating line Gn is electrically connected with all the pixel units in odd/even columns while a gating line Gn+1 is electrically connected with all the pixel units in even/odd columns. For example, the data line D2 is electrically connected with all the pixel units with the negative polarity in the first column and the second column, and the gating line G2 is electrically connected with all the pixel units with the positive polarity in the first row and all the pixel units with the negative polarity in the second row.

Figure 7:
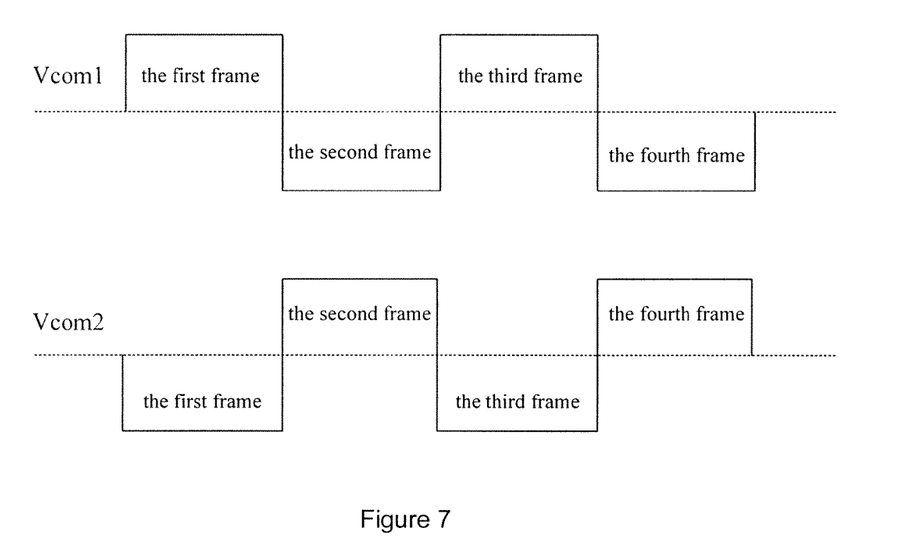
FIG. 7 is a timing chart of common voltages according to the invention.

FIG. 7 is a timing chart of common voltages according to the invention. As shown in FIG. 7, a first common voltage Vcom1 and a second common voltage Vcom2 are in rectangle square wave forms. In the same frame, the first common voltage Vcom1 and the second common voltage Vcom2 have opposite polarities. With changes of time sequences, the first common voltage Vcom1 and the second common voltage Vcom2 also change their own polarities respectively. For example, in the first frame, the first common voltage Vcom1 is on the high level and the second common voltage Vcom2 is on the low level. In the second frame, the first common voltage Vcom1 is on the low level and the second common voltage Vcom2 is on the high level.

Figure 8:
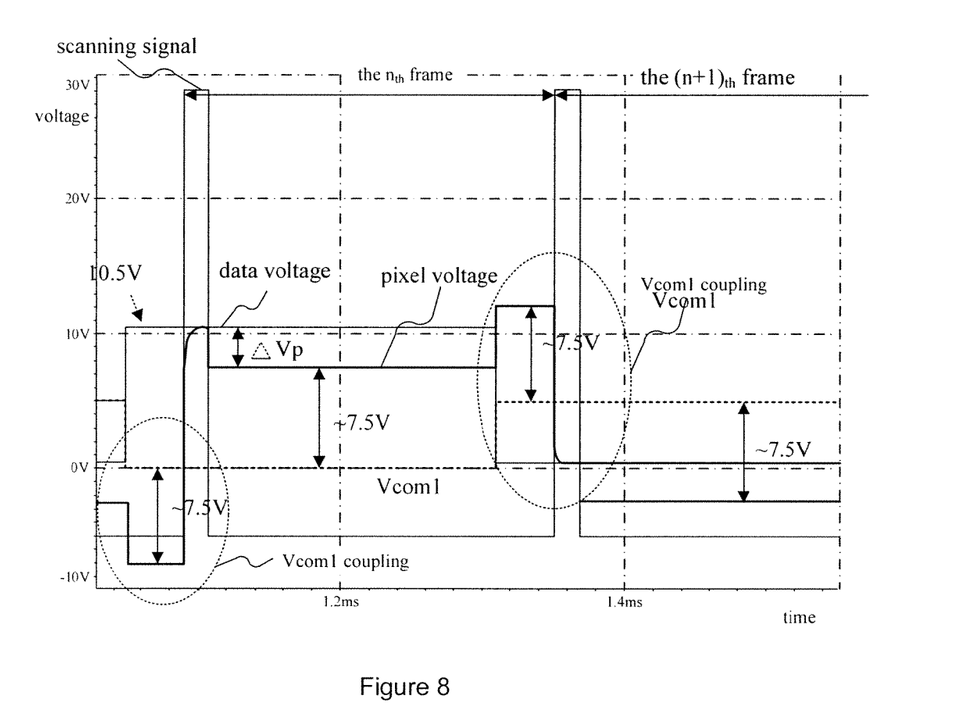
FIG. 8 is a driving simulation chart of the liquid crystal panel according to the invention.

FIG. 8 is a driving simulation chart of the liquid crystal panel according to the invention. The driving simulation chart in FIG. 8 is obtained when the liquid crystal panel has the following parameters: the ratio of Width to Length of the Thin Film Transistor in each pixel unit is 17/5.3 μm, capacitance of the storage capacitor (Cst) is 479 fF, capacitance of the parasitic capacitor (Cgs) between the gate electrode and the source electrode of the Thin Film Transistor is 29.6 fF, and capacitance of the liquid crystal capacitor (Clc) is 85 fF.

In the $n_{th}$ frame, the data voltages of 10.5V are applied to the data lines. After the scanning start signal is inputted to a gating line and the gating line is on the high level, the Thin Film Transistor electrically connected with the gating line is turned on. Via the Thin Film Transistor, the liquid crystal capacitor of the pixel unit is charged with 10.5V voltage on the data line, and the pixel voltage on the pixel electrode reaches a value equal to the destination data voltage. However, at the moment that the scanning signal is off, a decreasing feed-through voltage $\Delta Vp$ is generated for the pixel voltage. After the scanning signal is off and when the gating line is on the low level, the Thin Film Transistor is disconnected with the gating line, and the pixel electrode keeps the pixel voltage about 7.5V. In this case, the first common voltage Vcom1 is on the low level, which is about 0V, and the liquid crystal voltage between the two ends of the liquid crystal capacitor keep a positive voltage about 7.5V.

When the first common voltage Vcom1 changes from the low level 0V to the high level 5V, the pixel voltage on the pixel electrode also changes from the original 7.5V to 12.5V (shown in the part of "Vcom1 coupling" in FIG. 8) because of the capacitor coupling effect, and the liquid crystal voltage between the two ends of the liquid crystal capacitor keeps a positive voltage about 7.5V.

In the $(n+1)_{th}$ frame, after the scanning start signal is inputted to the gating line and the gating line is on the high level, the Thin Film Transistor connected with the gating line is turned on. Via the Thin Film Transistor, the liquid crystal capacitor of the pixel unit is charged with the 0.5V voltage on the data line, the pixel voltage on the pixel electrode reaches a value equal to the destination data voltage. However, at the moment that the scanning signal is off, a decreased feed-through voltage $\Delta Vp$ is generated for the pixel voltage. After the scanning signal is off and the gating line is on the low level, the Thin Film Transistor is disconnected with the gating line, and the pixel electrode keeps a pixel voltage of about −2.5V. In this case, the first common voltage Vcom1 is 5V, and the liquid crystal voltage between the two ends of the liquid crystal capacitor still keeps a negative voltage about 7.5V.

Similarly, the second common voltage Vcom2 having the same high and low levels and the opposite polarity to the first common voltage Vcom1, in combination with the change of data voltage applied to the data line, can also make the two ends of the liquid crystals keep the demanded voltage by applying a lower voltage to the data line.

As can be seen from the above analysis, when the data voltage applied to the data line is on the high level, the first common voltage Vcom1 and the second common voltage Vcom2 of the invention change to be on the low level; when the data voltage applied to the data line is on the low level, the first common voltage Vcom1 and the second common voltage Vcom2 change to be on the high level, and further in combination with the change of the data voltage, the source driver with 10V voltage difference can apply 7.5V voltage to the liquid crystal layer. Comparatively, in the conventional technology, only the source driver with 15 voltage difference can apply 7.5V voltage to the liquid crystal layer (referring to FIG. 2 for details). Therefore, the voltage difference outputted by the source driver in the invention is smaller, which can decrease the power consumption of the source driver.

Figure 9:
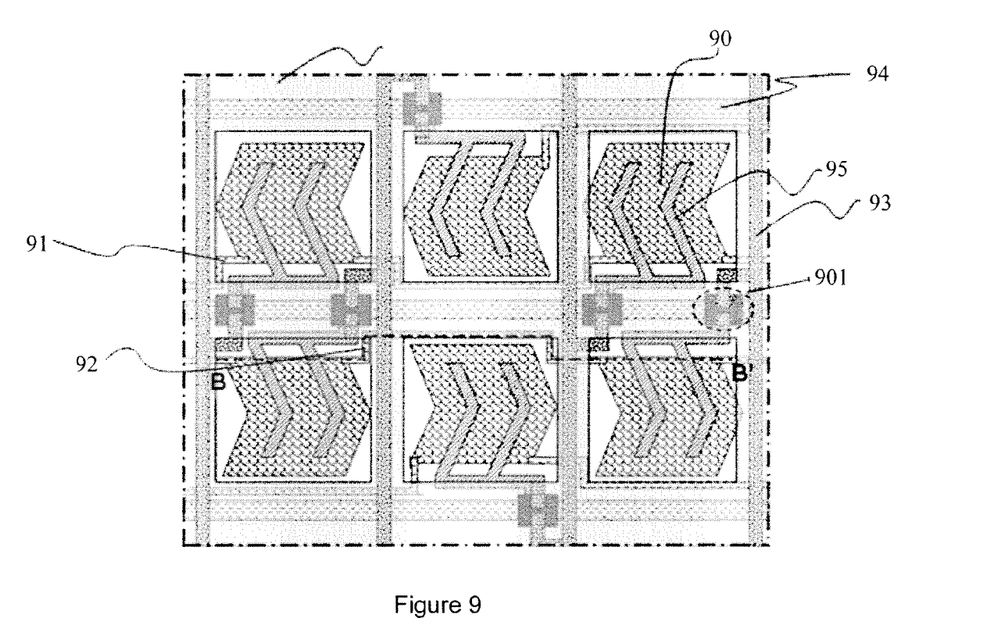
FIG. 9 is a plan view illustrating an FFS liquid crystal panel according to a second embodiment of the invention.

FIG. 9 is a plan view illustrating an FFS liquid crystal panel according to a second embodiment of the invention. In order to clearly describe a pixel unit, only a Black Matrix (BM) of the color filter substrate rather than the whole color filter is shown in FIG. 9. Common electrodes 90 of the first pixel units in each row are connected via a first common line 91 and are applied with a first common voltage Vcom1; common electrodes 90 of second pixel units in each row are connected via a second common line 92 and are applied with a second common voltage Vcom2. A Thin Film Transistor 901 receives a scanning start signal from a gating line 94, applies data voltage of a data line 93 to a liquid crystal capacitor so that the liquid crystal capacitor is charged, and the voltage between the two ends of the liquid crystal capacitor increases to be close to the destination data voltage. A horizontal electric field is formed between a pixel electrode 95 and the common electrode 90 with the common voltage, and the liquid crystal molecules rotate to some angles according to the electric field intensity between the two electrodes, so that the transmitting light intensity is controlled and the gray scale is formed for display.

Figure 10:
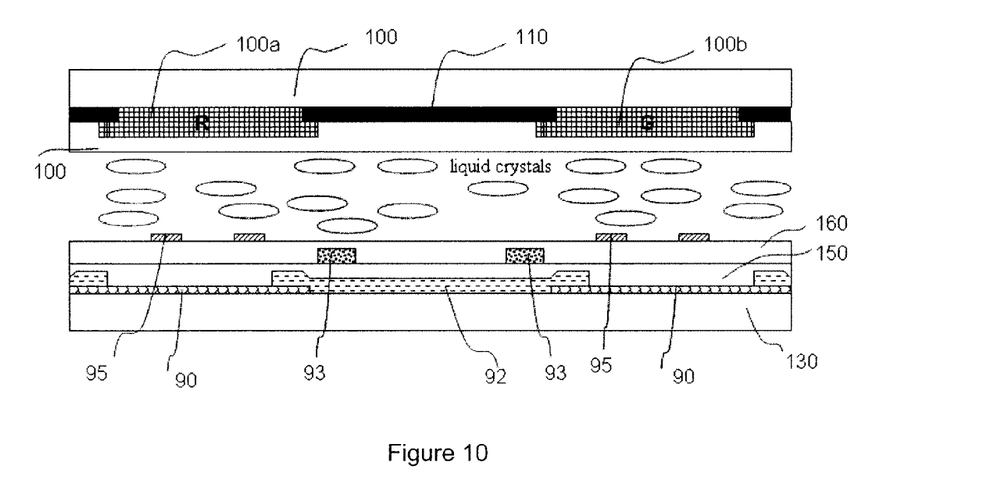
FIG. 10 is a sectional view along a B-B' direction after the combination of the upper and the lower substrates in FIG. 9.

FIG. 10 is a sectional view along a B-B' direction in FIG. 9. As shown in FIG. 10, the liquid crystal panel mainly includes an upper substrate, a lower substrate and a liquid crystal layer between the both substrates. The upper substrate is a color filter substrate, which includes an upper glass substrate 100, color filters 100a and 100b attached to the upper glass substrate 100 (where the color filters have three primary colors, RED short for R represented by 80a, GREEN short for G represented by 80b, and BLUE not shown in the Figure), and a black matrix 110 configured between the color filters, and partially overlapping the color filters at the two sides thereof for preventing light leakage.

The lower substrate is an array substrate which includes a lower glass substrate 130, a first metal layer, a gate insulation layer 150, a second metal layer and a passivation layer 160, where the first metal layer is covered with the gate insulation layer 150, the second metal layer is covered with the passivation layer 160.

The first metal layer includes common electrodes 90 and a second common line 92. The two ends of the second common line 92 cover a part of the common electrodes 90 respectively. The central top of the second common line 92 corresponds to the black matrix 110 of the upper substrate, and is hidden entirely for preventing light leakage. The first metal layer is covered with the gate insulation layer 150 for preventing the electrical connection between the first metal layer and the second metal layer.

The second metal layer includes pixel electrodes 95 and data lines 93. The data lines 93 are configured on the gate insulation layer 150 and are covered with the passivation layer 160, and the pixel electrodes 95 are configured on the passivation layer 160.

After the combination of the upper substrate and the lower substrate, the position and characteristic of the first common line is similar to those of the second common line, which will not be described in detail again.

The embodiments of the invention are described by taking the IPS and FFS liquid crystal panels as examples. However, according to the principle of the invention, the techniques may be applied to other types of liquid crystal panels, such as a Twisted Nematic (TN) liquid crystal panel and so on. The common electrodes of all the pixel units in the TN liquid crystal panel are electrodes forming storage capacitors' electrodes and a third common voltage needs to be inputted to the contraposition electrode of the color filter substrate. The connections among the common electrodes of all the pixel units are similar to those in the IPS and FFS liquid crystal panels, which will not be described in detail again.

The foregoing describes the liquid crystal panel of the invention in detail, and several specific examples are used to describe the principle and implementation manners of the invention. The above embodiments are only for better understanding of the method of the invention and the core idea thereof. The protection scope of the invention, however, is not limited to the above description. Any change or substitution, easily occurring to those skilled in the art, should be covered by the protection scope of the present invention.

What is claimed is:

1. A liquid crystal panel comprising a plurality of pixel units arranged in rows and in even and odd columns, each of the plurality of pixel units comprising gating lines, data lines, a pixel electrode, and a thin film transistor, wherein
common electrodes of first pixel units in a same row are electrically connected via a first common line, and common electrodes of second pixel units in the same row are electrically connected through a second common line, the first pixel unit and the second pixel unit having opposite polarities in the same frame;
the first common line is connected with a first common voltage and the second common line is connected with a second common voltage,
the first common voltage and the second common voltage are alternating current voltages respectively and have opposite polarities in the same frame; and
polarities of the first common voltage and the second common voltage change with polarities of data voltages applied to data lines,
wherein when the data voltage applied to the data line is on the high level, the first common voltage and the second common voltage change to be on the low lever; and wherein when the data voltage applied to the data line is on the low level, the first common voltage and the second common voltage change to be on the high level.

2. The liquid crystal panel of claim 1, wherein a single data line is electrically connected with the first pixel units or the second pixel units in two adjacent columns.

3. The liquid crystal panel of claim 1, wherein a single gating line is electrically connected with pixel units in all odd columns and in two adjacent rows or with pixel units in all even columns and in two adjacent rows.

4. The liquid crystal panel of claim 1, wherein a positive voltage is inputted to the first pixel units and a negative voltage is inputted to the second pixel units.

5. The liquid crystal panel of claim 1, wherein the alternating current voltages are square-wave alternating current voltages.

6. The liquid crystal panel of claim 1, wherein the liquid crystal panel is an In-Plane Switching liquid crystal panel, a Fringe-Field Switching liquid crystal panel, or a Twisted Nematic liquid crystal panel.

7. The liquid crystal panel of claim 6, wherein data voltages are applied to the data lines before the thin film transistor is turned on.

8. The liquid crystal panel of claim 6, wherein common electrodes of the Twisted Nematic liquid crystal panel are electrodes for forming a storage capacitor.

9. A liquid crystal display apparatus which has a liquid crystal panel and a driving circuit for driving the liquid crystal panel, comprising a plurality of gating lines, a plurality of data lines and a plurality of pixel units, each pixel unit comprising a pixel electrode and a thin film transistor, wherein
- common electrodes of first pixel units in a same row are electrically connected via a first common line, and common electrodes of second pixel units in the same row are electrically connected through a second common line, the first and the second pixel units have opposite polarities in the same frame;
- the first common line is connected with a first common voltage and the second common line is connected with a second common voltage,
- the first common voltage and the second common voltage are alternating current voltages and have opposite polarities in the same frame; and
- polarities of the first common voltage and the second common voltage are opposite to those of data voltages applied to the data lines, wherein when the data voltage applied to the data line is on the high level, the first common voltage and the second common voltage change to be on the low level; and wherein when the data voltage applied to the data line is on the low level, the first common voltage and the second common voltage change to be on the high level.

10. The liquid crystal display apparatus of claim 9, wherein a single data line is electrically connected with the first pixel units or the second pixel units in two adjacent columns.

11. The liquid crystal display apparatus of claim 9, wherein a single gating line is electrically connected with pixel units in all odd or even columns and in two adjacent rows.

12. The liquid crystal display apparatus of claim 9, wherein data voltages are applied to the data lines before the thin film transistor is turned on.

* * * * *